United States Patent [19]

Segura et al.

[11] Patent Number: 4,892,004
[45] Date of Patent: Jan. 9, 1990

[54] AUTOMATIC LENGTH ADJUSTER FOR CONTROL CABLES

[75] Inventors: Antonio T. Segura; Victorino S. Sallant, both of Barcelona, Spain

[73] Assignee: Pujol Y Tarrago S.A., Barcelona, Spain

[21] Appl. No.: 209,858

[22] Filed: Jun. 22, 1988

[30] Foreign Application Priority Data

Jul. 2, 1987 [ES] Spain ................................. 8701942

[51] Int. Cl.⁴ .............................................. F16C 1/10
[52] U.S. Cl. ........................ 74/501.5 R; 192/111 A; 188/196 R; 188/196 B; 248/56
[58] Field of Search .................. 74/501.5 R, 501.5 H, 74/500.5, 501.6, 502, 502.4, 502.6; 192/111 A; 70.25, 30 W; 188/196, 196 P, 196 B, 196 V; 248/55-60

[56] References Cited

U.S. PATENT DOCUMENTS

| | | | |
|---|---|---|---|
| 4,304,322 | 12/1981 | Beccharis | 192/111 A |
| 4,429,777 | 2/1984 | Taig | 192/111 A |
| 4,549,709 | 10/1985 | Deligny | 74/501.5 R X |
| 4,556,137 | 12/1985 | Abe | 74/501.5 R |
| 4,690,262 | 9/1987 | Hoyle | 192/111 A |
| 4,693,137 | 9/1987 | Deligny | 192/111 A X |
| 4,756,397 | 7/1988 | Deligny | 192/111 A |
| 4,762,017 | 8/1988 | Jaksic | 188/136 B X |
| 4,787,263 | 11/1988 | Jaksic | 74/501.5 R |

FOREIGN PATENT DOCUMENTS

| | | | |
|---|---|---|---|
| 0213857 | 3/1987 | European Pat. Off. | 192/111 A |
| 1163172 | 2/1964 | Fed. Rep. of Germany | 188/196 B |
| 2577330 | 8/1986 | France | 192/111 A |
| 418492 | 10/1934 | United Kingdom | 188/196 B |

*Primary Examiner*—Vinh Luong
*Attorney, Agent, or Firm*—Michael J. Striker

[57] ABSTRACT

An automatic length adjuster particularly for a clutch control cable comprises a tubular body telescopically engaged with a hollow cylindrical body traversed by the clutch cable which is anchored to the tubular body so as to be tensioned in use by a compression, compensation spring interposed between the bodies. The cylindrical body houses a mechanism for connecting the control cable operatively to the cylindrical body at different relative longitudinal positions so that control forces are transmitted from the cable to the clutch lever via the cylindrical body, in use, the said relative position changing with changes in the position of the clutch lever due to wear of the clutch disc linings. The adjuster is further provided with a system retaining it in a contracted condition to facilitate installation.

10 Claims, 1 Drawing Sheet

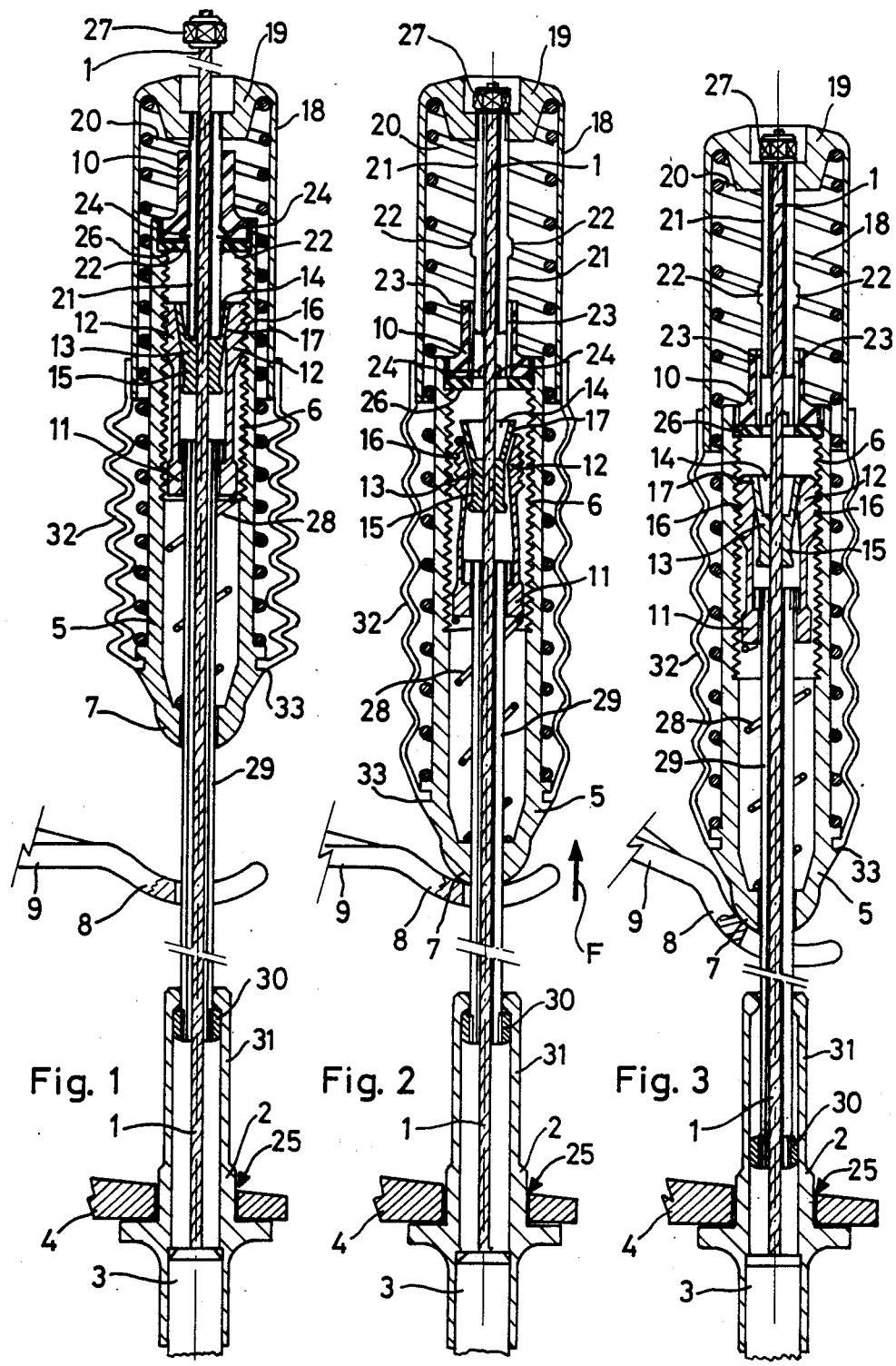

AUTOMATIC LENGTH ADJUSTER FOR CONTROL CABLES

BACKGROUND OF THE INVENTION

The present invention relates to a mechanical device for adjusting automatically the length of a control cable which operates a mechanical member which is subject to dimensional wear, particularly in cases in which this wear affects the operation of a fixed-length control cable. The invention is particularly suitable for adjusting cables which are used for operating motor-vehicle clutches, for which application the present invention had been conceived, developed and tested. The invention is adaptable, with little or no alteration to other applications.

As is well known, a clutch control cable comprises a flexible, tubular casing or sheath constituted by a tight metal coil which adapts easily to the irregularly-shaped compartments of motor-vehicle engines, and a thin steel cable which can slide longitudinally in both directions within it. When the control cable is fitted along a curved path and the casing is prevented from moving longitudinally relative to the inner cable, traction or thrust can be transmitted along the path.

The clutches used in the majority of motor vehicles are disc clutches and, in general, they are associated with a fly-wheel which is fixed to the crankshaft of the gearbox and are provided with a spring or springs which keep a pressure plate, fitted loosely on the shaft, tight against the outer face of the fly-wheel.

Situated between the fly-wheel and the plate is the driven disc which slides on the same gearbox shaft and which is gripped between them to transmit the rotation of the engine to the gearbox shaft.

The control cable transmits the movement of the clutch pedal to the clutch-operating lever, which disconnects the engine from the gearbox, overcoming the force of the spring or springs which keep the pressure plate, the driven disc and the fly-wheel under pressure. The clutch is disengaged to allow gear-changing to take place and then re-engaged to enable the rotation of the engine to be transmitted to the gearbox and the wheels. It is during this frequently occurring clutch re-engagement operation, when the anti-slip lining of the disc is subject to wear, with the result that, when the wear reaches a certain value, the control cable becomes tensioned such that it has a constant, fixed length and the pressure plate fails to exert the required pressure on the clutch disc. The disc starts to slip more easily and its wear increases progressively until it fails to fulfil its function of transmitting the rotation of the shaft to the gearbox, thereby causing considerable problems and inconvenience and potentially putting the vehicle and its occupants into dangerous situations.

This fault should be removed before it reaches this extreme condition either by modification of the active length of the control cable, if possible, or by replacement of the worn driven disc. In both cases additional expense and inconvenience are caused to the user.

SUMMARY OF THE INVENTION

The object of the invention is to provide apparatus which enables the length of a control cable to be adjusted automatically and, although it is particularly concerned with clutch cables, it is also applicable to other types of control cables.

Accordingly, the present invention provides a length adjuster for adjusting automatically the effective length of a control cable according to changes in the position of a member controlled by the cable, the adjuster comprising: a hollow cylindrical body telescopically engaged with a tubular body, means for anchoring the control cable to the tubular body so that it extends axially through the two bodies, and a compensation spring interposed between the two bodies and arranged to be stressed by the control cable the cylindrical body being connectable to the control cable at different relative longitudinal positions so as to transmit a control force from the cable to the member controlled by the cable, and the relative position of the connection changing automatically with changes in the position of the controlled member. The adjuster preferably includes a device for fixing it at a fixed point adjacent to the member controlled by the cable.

In a preferred embodiment of the invention, particularly applicable to clutch control cables, the compensation spring is a compression spring and the means for anchoring the control cable comprise an end member fixable to the control cable and engageable in a recessed seat in an outer end surface of the tubular body, the cable being tensioned in use. The adjuster is preferably arranged to act on the clutch control lever through a rounded thrust-head at the end of the cylindrical body remote from the cable anchorage, the head having an aperture through which the cable passes.

In the preferred embodiment, an end portion of the cylindrical body fits within the tubular body and the compensation spring, comprising a compression spring, extends around the outside of the cylindrical body, bearing at one end against an external, projecting flange thereof and at its other end against the inner end surface of the tubular body. A protective cover, preferably of bellows type, may enclose the spring outside the cylindrical body, the ends of the cover being sealed around the tubular body and the head of the cylindrical body.

Various means may be provided for connecting the control cable to the cylindrical body, to enable the control cable to operate a member such as, e.g. a clutch lever. However, in a preferred embodiment, the cylindrical body is internally threaded, the adjuster includes an annular clamp member slidable coaxially within the cylindrical body and resiliently biased towards the end thereof within the tubular body, the clamp member having resilient segments with outer threading which can cooperate with the internal threading of the cylindrical body and whose inner faces lie on a frustum which flares towards the said end; the adjuster further including a spacer member for fixing the cable and having an outer conical surface which can cooperate with the inner faces of the clamp segments, such that, in use, traction on the cable pulls the spacer into engagement with the clamp member forcing its segments resiliently apart into engagement with the threading of the cylindrical body to connect the cylindrical body to the cable.

In use with a clutch cable, once the clamp member has engaged with the threading of the cylindrical body, further traction on the cable due to further pressure on the clutch pedal will cause the cylindrical body to move telescopically out of the tubular body to operate the clutch lever which, in turn, causes disengagement of the clutch. When the clutch pedal is released, the clutch lever will be returned to its initial position by the springs acting on the clutch discs and will return the clamp member to its initial position in which it is disengaged from the threading of the cylindrical body. Alternatively, as the clutch discs become worn, their return travel, and hence the travel of the clutch lever, will increase so as to position the clamp member opposite a slightly different part of the threading. Preferably, the end of the cylindrical body within the tubular body is substantially closed by an annular guide member having a central bore through which the cable extends, the cable being guided thereby for movement longitudinally of the cylindrical body. The annular guide member preferably has a portion which projects from the cylindrical body into the tubular body and has two axially-extending grooves in its inner surface each of which opens circumferentially into a respective retaining recess at its end within the cylindrical body, and the tubular body has a guide tube through which the cable passes projecting from its end remote from the cylindrical body towards and into the annular guide member of the cylindrical body, the guide tube having two projections which can slide in the axial grooves of the guide tube and, when located adjacent said recesses, can be accommodated therein upon relative rotation of the tubular and cylindrical bodies to lock the two bodies against relative axial movement.

This latter feature of the invention enables the cylindrical and tubular bodies to be telescoped together against the force of the compensation spring, the tubular guide of the tubular body sliding in the guide member of the cylindrical body, and then to be locked in the shortened condition by rotation to engage the projections in the respective recesses. This facilitates the assembly of the length adjuster in a vehicle but, naturally, other means may be provided instead of the projections and recesses for retaining the adjuster in its shortened condition.

A further preferred feature of the invention is a substantially rigid, tubular sleeve for the cable which extends from the clamp member through an aperture in the end of the cylindrical member, its outer end being slidable in a tubular extension of an anchorage sleeve for anchoring the sheath of the control cable to a fixed point, in use. The sleeve will slide with the clamp member and preferably has a projection which abuts a cooperating stop of the anchorage sleeve to limit the travel of the clamp member in at least one direction.

BRIEF DESCRIPTION OF THE DRAWINGS

The invention will now be described in more detail by way of an example, with reference to the accompanying drawings, in which:

FIG. 1 a longitudinally-sectioned view of an automatic length-adjustment apparatus for a motor-vehicle clutch cable shown in the condition in which it is in the vehicle above the free end of the clutch lever;

FIG. 2 is a view similar to FIG. 1, showing the apparatus in its initial operative position when the clutch is engaged, and FIG. 3 is a view similar to that of the previous Figures, showing the apparatus in its operative position when the clutch is disengaged.

DESCRIPTION OF THE PREFERRED EMBODIMENT

With reference to the accompanying drawings, automatic length adjustment apparatus according to the invention is incorporated at the free end of a conventional clutch cable comprising a cable indicated 1 and a sheath 3. The apparatus includes an anchoring sleeve 2 for fixing the end of the sheath 3 to a support flange 4 of the motor-vehicle gearbox. The apparatus further includes a hollow cylindrical body 5 with internal threading 6 at one end and a part-spherical thrust head 7 at the opposite end which has a shape complementary to that of a recessed, forked end 8 of a gearbox lever 9 for operating the clutch (not shown). The threaded end of the cylindrical body 5 is substantially closed by means of an annular guide member 10. Both the head 7 and the guide member 10 have bores to allow the passage of the cable 1 which may be bare or covered.

The cable 1 also passes through an annular clamp member 11 and through a generally frusto-conical spacer 13 both housed within the body 5. The spacer 13 has its larger end, in which there is a recess 14, nearer the guide member 10 and is fixed to the cable 1 at its narrower end 15. The clamp member 11 has several deep axial slots (not shown in the drawings) which define resilient segments 12 each of which has external threading 16 similar to the internal threading 6 of the cylindrical body 5 with which it can engage. The segments 12 also have inner conical surfaces 17 with exactly the same taper as that of the spacer 13. The clamp member 11 is urged towards the spacer 13 by a conical spring 28 housed between it and the head 7.

The automatic adjuster in question also includes a tubular body 18 which is open at one end, which is telescopically mounted to the cylindrical body 5, and is substantially closed at its opposite end by a thickened wall 19 which defines an internal frusto-conical shoulder. A compensation spring 20 is seated at one end against the end wall 19, around the said shoulder, extends inside the tubular body 18 and along the outside of the body 5 and, at its opposite end, abuts a flange adjacent the head 7.

An end member 27 is fixed firmly to the free end of the cable 1 to ensure that the separate components are kept securely together and, in the condition of use of the apparatus, seats in a recess in the outer surface of the end wall 19.

The body 18 also houses a guide tube 21 through which the cable 1 passes and which is fixed coaxially in the end wall 19. The tube 21 projects into the guide member 10 and has two external projections 22 formed in diametrally opposed positions in precise dimensional conformity with two grooves 23 which extend along diametrally-opposed generatrices in the internal surface of the guide member 10. At the end of the guide member 10 within the body 5 the grooves 23 open circumferentially into respective retaining recesses 24.

In FIG. 1, the apparatus is shown in a contracted, locked condition in which it can be assembled in the motor vehicle by engagement of the sheath anchoring sleeve 2 in a forked housing 25 in the flange 4 with the thrust head 7 above the recessed end 8 of the clutch lever 9. For this purpose, the cylindrical body 5 and the tubular body 18 have been moved telescopically towards each other, compressing the spring 20, until the projections 22 of the guide tube 21 have passed beyond the length of the grooves 23. Then, by a slight rotation of the body 18, which is firmly fixed to the guide tube 21, the projections 22 have been located in the housings 24 and are retained therein. The projections 22 can easily be released subsequently by rotation of the tubular body 18 in the opposite sense, thus releasing the spring 20.

A small annular disc 26 is situated adjacent the end of the guide member 10 within the cylindrical body 5 to assist the locking operation described above by limiting the travel of the tubular body 18 towards the body 5 by the abutment of the projections 22 of the tube 21 therewith.

The facility for locking the apparatus in the contracted condition is of great practical use during assembly of the automatic adjuster, whether it is mass-produced in motor-vehicle factories or assembled as an isolated unit. In effect, the characteristic length and assembly tension of the clutch cable are set at the outset for each model of car and the adjuster is arranged in the locked position enabling the various connectors with which the cable is provided to be mounted at the points provided for them on the structure of the car without any difficulty.

In FIG. 2 the apparatus is shown in an unlocked condition; the projections 22 have been released from the recesses 24 and have passed along the grooves 23 so that they are situated at the other end of the guide member 10. The spring 20 has lengthened but is still resiliently compressed and the outer tubular body 18 and the cylindrical body 5 have moved apart until the head 7 has engaged in the forked end 8 of the gearbox lever 9 and the end member 27 has engaged in the recessed end 19 of the tubular member 18. This causes tensioning of the cable 1.

In this condition the clamp member 11 can slide within the cylindrical body 5 by virtue of the slight clearance which exists between their respective threads but is urged towards the spacer 15 by its biasing spring 28. Its movement in this direction is limited by means of a substantially rigid sleeve 29 attached at one end to the clamp member 11 and provided at its other end with a suitable stop member 30 which is slidable in a tubular portion 31 of the attachment sleeve 2 of the sheath 3.

FIG. 3 shows the position taken up by the apparatus when the clutch pedal is depressed. The cable 1 has pulled the spacer 13 downwardly, as seen in the drawings, until, after covering the small clearance which separates it from the clamp member 11, it has contacted the inner surfaces of the segments 12 causing them to move apart and consequently engage the corresponding threading of the body 5. The continuing downward movement of the cable 1 and of the spacer 13 has then pulled the cylindrical body 5 downwards so as to displace the lever 9 to the position shown in FIG. 3, thus disengaging the clutch. When the clutch pedal is released, the movements described above are reversed allowing the apparatus to return to the condition shown in FIG. 2.

As the clutch linings wear, the position of the lever 9 in the engaged condition of the clutch varies progressively in the direction shown by the arrow F in FIG. 2; this is the reason for a conventional cable of constant length preventing the clutch spring from continuing to exert a significant pressure on the anti-slip components of the clutch, causing the problem known as "clutch slip". With the present invention, however, as the lever 9 moves upwardly, different portions of the internal threading 6 of the cylindrical body 5 come to face the clamp threads 16 so that, when the clutch pedal is depressed, these clamp threads engage a said different portion of the internal threading 6 to effect the movement of the body 5 and hence of the clutch lever 9.

Finally, a protective bellows cover 32 extends from the open end of the tubular body 18 to the head 7 of the cylindrical body 5 and is engaged in a slot 33 in the head 7 to seal the automatic adjuster and ensure its protection against water, dust, sand and other agents which could damage its components.

It will be appreciated that the apparatus just described has great functional simplicity and requires a very small number of parts, which makes it safe and reliable in operation and ensures the antislip linings with which clutch discs are provided a longer operative life than is currently possible at a practically constant level of efficiency. Moreover, its small size and ease of fitting avoid the need for any additional space in the engine compartment of the motor vehicle.

What is claimed is:

1. A length adjuster for automatically adjusting an effective length of a control cable for controlling a member in accordance with a change in a position of the member, said length adjuster comprising:

a hollow cylindrical body;

a tubular body telescopically mounted with respect to said hollow cylindrical body;

means for anchoring the control cable to said tubular body, the control cable extending axially through said hollow cylindrical body and said tubular body;

a compensation spring interposed between said hollow cylindrical body and said tubular body; and means for connecting the control cable to said hollow cylindrical body at different relative longitudinal positions in accordance with different positions of the member to transmit a control force from the cable to the member in a respective position of the member;

said hollow cylindrical body having an end portion received within said tubular body and an external projecting flange, said tubular body having an inner end surface, said compensation spring comprising a compression spring extending around an outside surface of said hollow cylindrical body between said external projecting flange of said hollow cylindrical body and said inner end surface of said tubular body, said length adjuster further comprising a protective cover enclosing said compression spring and having opposite ends sealingly attached to said hollow cylindrical body and said tubular body, respectively.

2. A length adjuster as claimed in claim 1, further comprising an annular clamp member slidable coaxially within said hollow cylindrical body and including resilient segments having inner faces lying on a frustum which flares toward said tubular body; a spacer to be fixed to the cable and having an outer conical surface cooperating with said inner faces of said resilient segments of said clamp member; and resilient means for biasing said clamp member towards said tubular body, said hollow cylindrical body having an internal thread, said resilient segments of said clamp member having outer threads cooperating with said inner thread of said hollow cylindrical body to operatively connect said hollow cylindrical body with the control cable when said resilient segments move apart upon movement of said spacer into engagement with said clamp member under an action of a traction force applied to the cable.

3. A length adjuster as claimed in claim 2, further comprising an annular guide member for substantially closing said end portion of said hollow cylindrical member and having a central bore through which said cable is extendable.

4. A length adjuster as claimed in claim 3, wherein said annular guide member including a portion extending from said hollow cylindrical body into said tubular body and having an inner surface with two axially-extending grooves, said annular guide member having two retaining recesses arranged at respective ends of said two axially-extending grooves and located within said hollow cylindrical body, said tubular body including a guide tube through which the control cable passes and which projects from an end of said tubular body remote from said hollow cylindrical body into said annular guide member, said guide tube having two projections slidable in said axially-extending grooves and, when located adjacent said recesses, receivable therein upon relative rotation of said tubular and hollow cylindrical bodies for locking said tubular and hollow cylindrical bodies against relative axial displacement thereof.

5. A length adjuster as claimed in claim 2, wherein said hollow cylindrical body has an aperture at an end thereof which is opposite to said end portion, said length adjuster further comprising a substantially rigid tubular sleeve enclosing said cable and extending from said clamp member and through said aperture, and an anchorage sleeve for anchoring a sheath of the control cable to a fixed point and having a tubular extension in which an end portion of said tubular sleeve remote from said clamp member is slidable.

6. A length adjuster for automatically adjusting an effective length of a control cable for controlling a member in accordance with a change in a position of the member, said length adjuster comprising:
   a hollow cylindrical body;
   a tubular body telescopically mounted with respect to said hollow cylindrical body, said tubular body being radially outside said hollow cylindrical body;
   means for anchoring the control cable to said tubular body, the control cable extending axially through said hollow cylindrical body and said tubular body;
   a compensation spring interposed between said hollow cylindrical body and said tubular body; and
   means displaceable within said hollow cylindrical body for connecting the control cable to said hollow cylindrical body at different relative longitudinal positions in accordance with different positions of the member to transmit a control force from the cable to the member in a respective position of the member.

7. A length diameter as claimed in claim 6, wherein said hollow cylindrical body has an end portion received within said tubular body and an external projecting flange, said tubular body having an inner end surface, said compensation spring comprising a compression spring extending around an outside surface of said hollow cylindrical body between said external projecting flange of said hollow cylindrical body and said inner end surface of said tubular body.

8. A length adjuster as claimed in claim 6, wherein said anchoring means comprises an end member, said tubular body having a seat at an outer end thereof for receiving said end member.

9. A length adjuster as claimed in claim 6, wherein said hollow cylindrical body has a rounded thrust head at an end thereof remote from said tubular body for engaging the member, said rounded thrust head having an aperture through which the control cable extends.

10. A motor vehicle clutch control mechanism comprising:
   a clutch operating member;
   a control cable for controlling operation of said clutch operating member; and
   a length adjuster for automatically adjusting an effective length of said control cable in accordance with a change in a position of said clutch operating member, said length adjuster comprising:
   a hollow cylindrical body,
   a tubular body telescopically mounted with respect to said hollow cylindrical body, said tubular body being radially outside said hollow cylindrical body,
   means for anchoring said control cable to said tubular body, said control cable extending axially through said hollow cylindrical body and said tubular body,
   a compensation spring interposed between said hollow cylindrical body and said tubular body, and
   means displaceable within said hollow cylindrical body for connecting said control cable to said hollow cylindrical body at different relative longitudinal positions in accordance with different positions of said cable operating member to transmit a control force from said cable to said cable operating member in a respective position of said cable operating member.

* * * * *